US011916734B2

(12) United States Patent
D'Acunto et al.

(10) Patent No.: US 11,916,734 B2
(45) Date of Patent: Feb. 27, 2024

(54) THIRD PARTY NETWORK AND NETWORK SLICE MANAGEMENT

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Lucia D'Acunto, Delft (NL); Toni Dimitrovski, The Hague (NL); Wieger IJntema, Hannover (DE); Wiltfried Pathuis, Veendam (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 'S-Gravenhage (NL)

(*) Notice: Subject to any disclaimer, the term of this patent is extended or adjusted under 35 U.S.C. 154(b) by 96 days.

(21) Appl. No.: 17/441,229

(22) PCT Filed: Mar. 20, 2020

(86) PCT No.: PCT/EP2020/057740
§ 371 (c)(1),
(2) Date: Sep. 20, 2021

(87) PCT Pub. No.: WO2020/193394
PCT Pub. Date: Oct. 1, 2020

(65) Prior Publication Data
US 2022/0158903 A1    May 19, 2022

(30) Foreign Application Priority Data
Mar. 22, 2019 (EP) .................................. 19164616

(51) Int. Cl.
*H04L 41/12* (2022.01)
*H04L 9/40* (2022.01)
(Continued)

(52) U.S. Cl.
CPC ........ *H04L 41/0816* (2013.01); *H04L 41/083* (2013.01); *H04L 41/12* (2013.01); *H04L 63/0876* (2013.01)

(58) Field of Classification Search
CPC ... H04L 41/0816; H04L 41/083; H04L 41/12; H04L 63/0876; H04L 41/0813
See application file for complete search history.

(56) References Cited

U.S. PATENT DOCUMENTS 9,497,136 B1    11/2016    Ramarao et al.
10,361,843 B1    7/2019    Suthar et al.
(Continued)

FOREIGN PATENT DOCUMENTS

| CN | 101547150 A | 9/2009 |
| CN | 106922002 A | 7/2017 |

(Continued)

OTHER PUBLICATIONS

3GPP TS 22.261 v16.3.0, 3rd Generation Partnership Project; Technical Specification Group Services and System Aspects; Service requirements for the 5G system; Stage 1 (Release 16) (Mar. 2018).

(Continued)

*Primary Examiner* — Abdullahi E Salad
(74) *Attorney, Agent, or Firm* — Hamilton, Brook, Smith & Reynolds, P.C.

(57) ABSTRACT

The invention relates to a communication network which is configured to enable instantiation of network slices which represent virtual networks. The invention further relates to a content application server (CAS) for providing an application service via a network slice to at least one user equip- (Continued)

ment (UE). A network function (SREF) is provided which on the one hand may have access to one or more slice management network functions (CSMF, NSMF, NSSMF) and on the other hand may be accessible to the CAS. The network function (SREF) may abstract the properties of the network slice using a data structure representing a slice object and expose these abstracted properties to the CAS by providing access to the slice object. The slice object may comprise modifiable properties which represent modifiable properties of the corresponding network slice. The CAS may at least in part manage the network slice by modifying one or more modifiable properties, and the SREF may then translate the modified properties into one or more requests for the slice management network functions. The SREF may thereby enable the CAS to perform slice management, while at the same time reducing the complexity of the slice management.

13 Claims, 7 Drawing Sheets

(51) Int. Cl.
  *H04L 41/0816* (2022.01)
  *H04L 41/083* (2022.01)

(56) References Cited

U.S. PATENT DOCUMENTS

| | | | |
|---|---|---|---|
| 10,440,642 B2 | 10/2019 | Zait | |
| 10,506,489 B2 * | 12/2019 | Vrzic | H04W 36/26 |
| 10,644,955 B2 * | 5/2020 | Zhang | H04L 41/0895 |
| 10,986,540 B2 * | 4/2021 | Bor Yaliniz | H04W 28/26 |
| 11,051,210 B2 * | 6/2021 | Sciancalepore | H04W 24/02 |
| 11,470,620 B2 | 10/2022 | IJntema et al. | |
| 2011/0249685 A1 | 10/2011 | Liang et al. | |
| 2013/0339495 A1 * | 12/2013 | Mower | H04L 41/0843 |
| | | | 709/220 |
| 2016/0352924 A1 | 12/2016 | Senarath et al. | |
| 2016/0353367 A1 * | 12/2016 | Vrzic | H04W 28/0247 |
| 2016/0353465 A1 * | 12/2016 | Vrzic | H04L 41/5054 |
| 2017/0086118 A1 | 3/2017 | Vrzic | |
| 2017/0208019 A1 | 7/2017 | Shimojou et al. | |
| 2017/0366399 A1 * | 12/2017 | Li | H04W 40/34 |
| 2018/0123878 A1 | 5/2018 | Li et al. | |
| 2018/0131578 A1 | 5/2018 | Cui et al. | |
| 2018/0132117 A1 | 5/2018 | Senarath et al. | |
| 2018/0132138 A1 * | 5/2018 | Senarath | H04L 41/0813 |
| 2018/0139129 A1 | 5/2018 | Dowlatkhah et al. | |
| 2018/0199279 A1 | 7/2018 | Baek et al. | |
| 2018/0220276 A1 | 8/2018 | Senarath et al. | |
| 2018/0260200 A1 | 9/2018 | Karagiannis et al. | |
| 2018/0316627 A1 | 11/2018 | Cui et al. | |
| 2019/0109768 A1 | 4/2019 | Senarath et al. | |
| 2019/0174320 A1 | 6/2019 | Kodaypak et al. | |
| 2019/0174322 A1 | 6/2019 | Deviprasad et al. | |
| 2019/0174347 A1 | 6/2019 | Dowlatkhah et al. | |
| 2019/0182876 A1 | 6/2019 | Ying et al. | |
| 2019/0357129 A1 | 11/2019 | Park et al. | |
| 2019/0357130 A1 * | 11/2019 | Garcia Azorero | H04W 8/08 |
| 2020/0044909 A1 | 2/2020 | Huang et al. | |
| 2020/0045548 A1 | 2/2020 | Dowlatkhah et al. | |
| 2021/0067421 A1 | 3/2021 | Kidd et al. | |
| 2021/0345357 A1 * | 11/2021 | Ijntema | H04L 47/781 |
| 2021/0392040 A1 * | 12/2021 | Kerboeuf | H04L 41/5045 |
| 2022/0239568 A1 | 7/2022 | Celozzi et al. | |
| 2022/0417758 A1 | 12/2022 | Nooren et al. | |
| 2023/0006884 A1 | 1/2023 | IJntema et al. | |
| 2023/0007662 A1 | 1/2023 | IJntema et al. | |
| 2023/0031777 A1 | 2/2023 | IJntema et al. | |

FOREIGN PATENT DOCUMENTS

| | | |
|---|---|---|
| CN | 107087255 A | 8/2017 |
| CN | 107113195 A | 8/2017 |
| CN | 107743100 A | 2/2018 |
| CN | 108270823 A | 7/2018 |
| CN | 108293004 A | 7/2018 |
| CN | 108566659 A | 9/2018 |
| CN | 109120426 A | 1/2019 |
| CN | 109391498 A | 2/2019 |
| CN | 109417731 A | 3/2019 |
| EP | 3 396 997 A1 | 10/2018 |
| WO | WO 2018/035431 A1 | 2/2018 |
| WO | 2018/137499 A1 | 8/2018 |
| WO | WO 2018/169382 A1 | 9/2018 |
| WO | 2018/228674 A1 | 12/2018 |
| WO | 2019/160390 A1 | 8/2019 |
| WO | 2019/206396 A1 | 10/2019 |
| WO | 2020/074687 A1 | 4/2020 |
| WO | 2021/110894 A1 | 6/2021 |
| WO | 2021/122516 A1 | 6/2021 |
| WO | 2021/123411 A1 | 6/2021 |

OTHER PUBLICATIONS

3GPP TS 28.801 v15.1.0, $3^{rd}$ Generation Partnership Project; Technical Specification Group Services and System Aspects; Telecommunications Management; Study on Management and Orchestration of Network Slicing for Next Generation Network (Release 16) (Jan. 2018).

European Search Report for EP Application No. 19164616.5, entitled: Third Party Network and Network Slice Management; dated Sep. 23, 2019.

International Search Report and Written Opinion for PCT/EP2020/057740, entitled: Third Party Network and Network Slice Management; dated May 27, 2020.

3GPP TS 23.502 V16.2.0 (Sep. 2019), Technical Specification, 3rd Generation Partnership Project; Technical Specification Group Services and System Aspects; Procedures for the 5G System (SGS); Stage 2 (Release 16).

3rd Generation Partnership Project (3GPP) TS 23.501 VI6.2.0 (Sep. 2019), Technical Specification, 3rd Generation Partnership Project; Technical Specification Group Services and System Aspects; System Architecture for the 5G System (SGS); Stage 2 (Release 16).

3rd Generation Partnership Project; Technical Specification Group Services and System Aspects; Management and orchestration; Architecture framework (Release 16), 3GPP TS 28.533 V16.1.0 Technical Specification, pp. 1-27 (2019).

3rd Generation Partnership Project; Technical Specification Group Services and System Aspects; Management and Orchestration; Concepts, Use Cases and Requirements (Release 16), 3GPP TS 28.530 VI6.0.0, Technical Specification, pp. 1-29 (2019).

China Telecom et al: "Discussion on network slice priority", 3GPP Draft; S5-185607 Discussion on Network Slice Priority, 3rd Generation Partnership Project (3GPP), Mobile Competence Centre ; 650, Route Des Lucioles ; F-06921 Sophia-Antipolis Cedex ; France • vol. SA WG5, No. Belgrade (Serbia); Aug. 20, 2018-Aug. 24, 2018 Aug. 24, 2018 (Aug. 24, 2018), XP051544208.

Hua Wei, "Add use case and requirement for network slice instance priority", 3GPP Draft; S5-175111 PCR 28 530 Add Use Case and Requirement for Network Slice Instance Priority, 3rd Generation Partnership Project (3GPP), Oct. 16, 2017-Oct. 20, 2017: F-069(SA WG5) (Oct. 15, 2017).

Qiang, L., et al., "Technology Independent Information Model for Network Slicing; draft-qiang-coms-netslicing-information-model-01," Internet Engineering Task Force, pp. 1-25, Standard working draft, Internet Society, Rue Des Falaises Ch-120, No. 1 (2017).

Qualcomm Incorporated: "(TP for NR BL CR for TS 38.413): General Fallback", 3GPP Draft; R3-184685 General Fallback, Aug. 11, 2018.

3GPP TS 28.531 V16.3.0 (Sep. 2019), Technical Specification, 3rd Generation Partnership Project; Technical Specification Group Services and System Aspects; Management and orchestration; Provisioning (Release 16).

(56) References Cited

OTHER PUBLICATIONS

ETSI GS NFV-MAN 001 VI .1.1 (Dec. 2014), Network Functions Virtualisation (NFV); Management and Orchestration.
Chinese Office Action for Application No. 202080036708.6, dated Dec. 7, 2023.
3GPP TR 29.890 V1.2.0 Technical Specification Group Core Network and Terminals; Study on CT WG3 Aspects of 5G System—Phase 1; Stage 3 (Release 15) (Dec. 2017).
Wang, Q., et al., "Architecture and Key technologies of 5G Transport Network Slicing," ZTE Technology Journal, 24 (1):58- 61 (Feb. 2018).

\* cited by examiner

THIRD PARTY NETWORK AND NETWORK SLICE MANAGEMENT

This application is the U.S. National Stage of International Application No. PCT/EP2020/057740, filed Mar. 20, 2020, which designates the U.S., published in English, and claims priority under 35 U.S.C. § 119 or 365(c) to European Application No. 19164616.5, filed Mar. 22, 2019. The entire teachings of the above applications are incorporated herein by reference.

FIELD OF THE INVENTION

The invention relates to a communication network which is configured to enable instantiation of network slices which represent virtual networks. The invention further relates to a content application server (CAS) and a computer-implemented method for providing an application service via a network slice to at least one user equipment (UE). The invention further relates to a network function, which is also termed slice resource exposure function (SREF), and computer-implemented method for enabling the content application server to at least in part manage the network slice. The invention further relates to a network node or a distributed system of network nodes configured to establish the network function in the communication network. The invention further relates to a computer-readable medium comprising structured data enabling the management of the network slice by the content application server.

BACKGROUND ART

Next generation network architectures, such as 5G, may separate network functions from the underlying hardware resources, being in the case of a telecommunication network the network nodes of the network. For that purpose, so-called Network Virtualization (NV) techniques may be used, and in particular Network Function Virtualization (NFV) techniques which provide network functions that are instantiable in software using the hardware of one or more of the network nodes.

Such next generation network architectures may further define virtual data planes which separate data traffic in the network. Such virtual data planes, which may be established by Software-Defined Network (SDN) but also by other techniques, may include a control plane to enable transmission of control data in the network, and a user plane to enable transmission of user data to and/or from User Equipment (UE) connected to the network. The user plane may also be referred to as 'data plane'.

A design target of such and similar next generation network architectures is to provide networks which may be 'tailored' to the requirements of the applications which use the network. Such tailoring may be obtained by instantiation of different network slices which represent virtual networks with different feature sets, e.g., providing different network functions and/or having different network characteristics.

A specific example is 5G network slicing, which allows for the creation of virtual network slices on top of the physical network fabric, with the network slices being tailorable towards requirements of specific applications and application categories. For example, the tailoring may be in terms of Quality of Service (QoS) (e.g., bandwidth, delay, jitter, etc.), network topology (e.g., Local Break Out) and/or in specific functions (e.g., local processing: caching, transcoding, synchronization, etc.). For example, in the case of video streaming, such specific functions in a network slice may include a local streaming server (to minimize latency and possibly increase bandwidth), a transcoder (to re-encode a video stream in a format suitable for the UE), an MPEG DANE (for QoS management), an ICE/STUN server (for NAT traversal), a stream synchronizer (e.g., a device that supports the UE in the synchronization of multiple audio-visual streams, e.g., for a videoconferencing application), and more. This tailoring of feature sets is expected to enable new services, e.g., where ultra-low latency is required, such as Virtual Reality (VR) and Augmented Reality (AR), and improve the performance of existing services, e.g., video streaming in a highly mobile environment.

Network slices may be managed by a network operator using network functions which are accessible to the network operator. For example, in 5G, the following network functions may be used for network slice management:

Network Slice Management Function (NSMF): this function may manage slice level parameter such as increasing or decreasing the size of a network slice (in terms of network resources allocated to the slice) and changing priorities among slices.

Network Slice Subnet Management Function (NSSMF): this function may allow to change internal characteristics of a network slice, such as adding and removing network functions (NFs) from the network slice itself.

Network slices may also support services which are provided by third parties outside of the communication network managed by the network operator, i.e., outside of the operator network. For example, as also shown in FIG. 1, a content application server (CAS) may be connected via a data network (DN) to the communication network 10 and provide an application service via a network slice to at least one user equipment (UE) which is connected to the communication network.

In recognition of the above, 3GPP TS 22.261 [1] has specified a number of requirements to enable third parties to optimally offer and operate application services:

1. Based on operator policy, the 5G network shall provide suitable APIs to allow a trusted 3rd party to scale a network slice used for the 3rd party, i.e. to adapt its capacity.
2. Based on operator policy, the 5G network shall provide suitable APIs to allow a trusted 3rd party to monitor the network slice used for the 3rd party.
3. Based on operator policy, the 5G network shall provide suitable APIs to allow a trusted 3rd party application to request appropriate QoE from the network.

It would therefore be desirable to enable a trusted third party to manage and monitor the network slice(s) being used or intended to be used by the third party.

3GPP TR 28.801 [2] proposes a Communication Service Management Function (CSMF), which is meant to receive requirements from communication service providers and translate the requirements into network slice related requirements.

However, [2] does not specify a means of communication between the CSMF and the 3rd party CAS, and as such, the CAS may have no means for communicating with the CSMF. In addition, the CSMF is only envisioned to obtain the requirements from the CAS and to inform the CAS on the performance of the network slice and application service. As such, the CAS may not be able to specify optimal requirements for its service(s), since the CAS currently has no way of knowing the possibilities supported by the network for supporting its application service.

REFERENCES

[1] 3rd Generation Partnership Project (3GPP), "*Service requirements for next generation new services and markets*", TS 22.261, v16.3.0

[2] 3rd Generation Partnership Project (3GPP), "*Study on management and orchestration of network slicing for next generation network*", TR 28.801, v15.1.0

SUMMARY OF THE INVENTION

It may be desirable to enable a CAS to be informed of properties of a network slice via which an application service is or is to be provided, and to at least in part manage the network slice based on the properties of the network slice.

The following measures may involve providing a new network function which on the one hand may have access to one or more slice management network functions (CSMF, NSMF, NSSMF) and on the other hand may be accessible to the CAS. The network function, which may also be referred to as a slice resource exposure function (SREF), may abstract the properties of the network slice using a data structure representing a slice object and expose these abstracted properties to the CAS by providing access to the slice object. The slice object may comprise modifiable properties which represent modifiable properties of the corresponding network slice. The CAS may at least in part manage the network slice by modifying one or more modifiable properties, and the SREF may then translate the modified properties into one or more requests for the slice management network functions.

In accordance with a first aspect of the invention, a network node or a distributed system of network nodes may be provided which may be configured as a network function (SREF) for a communication network, wherein the communication network may be configured to enable instantiation of network slices which represent virtual networks, wherein the communication network may comprise one or more slice management network functions (CSMF, NSMF, NSSMF) for management of the network slices, wherein the network node or the distributed system may comprise:

a network interface configured to communicate with the communication network;

a processor system for enabling a content application server (CAS), which content application server may be configured to provide an application service via a network slice to at least one user equipment (UE), to at least in part manage the network slice, wherein the processor system may be configured to:

generate an abstraction of properties of the network slice in the form of a data structure representing a slice object;

expose the properties of the network slice to the content application server by providing access to the slice object;

wherein the slice object may comprise at least one modifiable object property representing one or more properties of the network slice which are modifiable by at least one slice management network function, wherein the processor system may be further configured to:

enable the content application server to modify the modifiable object property to obtain a modified object property; and based on the modified object property, send a request to the at least one slice management network function to request a corresponding modification of the one or more properties of the network slice.

In accordance with a further aspect of the invention, a communication network may be provided which may be configured to enable instantiation of network slices which represent virtual networks, wherein the communication network may comprise one or more slice management network functions (CSMF, NSMF, NSSMF) for management of the network slices, wherein the communication network may comprise the network node or distributed system (SREF) as described above.

In accordance with a further aspect of the invention, a content application server (CAS) may be provided which may be configured to provide an application service via a network slice of a communication network to at least one user equipment (UE), wherein the communication network may be configured to enable instantiation of network slices which represent virtual networks, wherein the communication network may comprise one or more slice management network functions (CSMF, NSMF, NSSMF) for management of the network slices, wherein the content application server may comprise:

a network interface configured to communicate with the communication network;

a processor system which may be configured to:

authenticate to a network function (SREF) which is configured to enable the content application server to at least in part manage the network slice;

access a slice object generated by the network function, wherein the slice object comprises at least one modifiable object property representing one or more properties of the network slice which are modifiable by at least one slice management network function; and manage the network slice by modifying the modifiable object property of the slice object to obtain a modified object property.

In accordance with a further aspect of the invention, a computer-readable medium may be provided which may comprise transitory or non-transitory data representing a slice object, wherein the slice object may comprise an abstraction of properties of a network slice which may represent a virtual network and which may be instantiable in a communication network, wherein the slice object may comprise at least one modifiable object property representing one or more properties of the network slice which are modifiable by at least one slice management network function (CSMF, NSMF, NSSMF) of the communication network.

In accordance with a further aspect of the invention, a computer implemented method may be provided for use with a communication network configured to enable instantiation of network slices which represent virtual networks, wherein the communication network may comprise one or more slice management network functions (CSMF, NSMF, NSSMF) for management of the network slices, wherein the method may comprise enabling a content application server (CAS), which may be configured to provide an application service via a network slice to at least one user equipment (UE), to at least in part manage the network slice by:

generating an abstraction of properties of the network slice in the form of a data structure representing a slice object;

exposing the properties of the network slice to the content application server by providing access to the slice object;

wherein the slice object may comprise at least one modifiable object property representing one or more properties of the network slice which are modifiable by at least one slice management network function, wherein the method may further comprise:

enabling the content application server to modify the modifiable object property to obtain a modified object property; and based on the modified object property, sending a request to the at least one slice management network function to request a corresponding modification of the one or more properties of the network slice.

In accordance with a further aspect of the invention, a computer implemented method may be provided for use with a content application server (CAS) which may be configured to provide an application service via a network slice of a communication network to at least one user equipment (UE), wherein the network slice represents a virtual network, wherein the communication network may be configured to enable instantiation of network slices, wherein the communication network may comprise one or more slice management network functions (CSMF, NSMF, NSSMF) for management of the network slices, wherein the method may comprise:

authenticating to a network function (SREF) which is configured to at least in part enable the content application server to manage the network slice;

accessing a slice object generated by the network function, wherein the slice object may comprise at least one modifiable object property representing one or more properties of the network slice which are modifiable by at least one slice management network function; and managing the network slice by modifying the modifiable object property of the slice object to obtain a modified object property.

In accordance with a further aspect of the invention, a computer-readable medium may be provided which may comprise transitory or non-transitory data representing a computer program, wherein the computer program may comprise instructions for causing a processor system to perform one of the above methods.

The above measures may involve providing a network function, which due to its functionality may in the following also simply be referred to as slice resource exposure function (SREF), which on the one hand may have access to one or more slice management network functions (CSMF, NSMF, NSSMF) and on the other hand may be accessible to the CAS. By having access to the slice management network functions, the SREF may determine the properties of the network slice and generate an abstraction of these properties using a data structure which forms a slice object. In general, it is known to refer to data structures as objects and vice versa. The properties of the slice object may thereby represent abstractions of properties of the network slice with the purpose of providing necessary properties to the application service and hiding the complexity of the network slice. A specific example is that a property of the slice object may identify a bandwidth capacity of a Radio Access Network (RAN) link of the network slice. In general, such abstraction may involve omitting certain properties of the network slice in the slice object, for example those which are not relevant for the CAS as they do not affect the application service. The properties of the slice object may thus represent a subset, and possibly a small subset, of all properties of the network slice. Such abstraction may also involve generalization, for example by the SREF representing a set of specific properties of a network slice as one property of the slice object. Such an object property may thereby represent a generalization and thus an abstraction of a set of specific properties.

For example, the slice object property that identifies the bandwidth capacity of a RAN may translate to the capacity of multiple links between access and core network functions in the network slice. In general, the network slice may contain many network functions and it may not be desirable to expose these the CAS, except when needed by the application service. As such, such network functions may be omitted from the slice object, in that the slice object may not contain a representation thereof. This may provide a form of network control. In general, an operator may not want to expose the network structure of its communication network to a third party, e.g., a number of control and user plane functions, links between these functions and properties of those links, nor does the operator may want to give the ability to said third party to completely configure these functions. Therefore, the operator may provide a slice object as an abstraction of the communication network, and in particular of a network slice, and only expose the properties of those functions and links which are needed by the third party to the third party, e.g., those that interface with the communication network, e.g., RAN and DN.

The properties of the network slice which are identified and enumerated in the slice object may be exposed by the SREF to the CAS. Although the exposed properties are in principle object properties, they are in the following also referred to as slice properties as they represent (abstractions of) network slice properties, with the understanding that the CAS technically accesses the object properties. Here and elsewhere, 'exposing' may refer to the SREF providing the CAS with access to the properties and thereby enabling the CAS to learn about the properties. Specifically, the SREF may expose the properties to the CAS by providing the CAS with access to the slice object. Such access may involve various direct or indirect mechanisms. For example, as also described elsewhere, the SREF may provide access to the slice object, and thereby expose the properties of the network slice, via an application programming interface (API), and specifically via functions and function calls of the API.

In another example, the SREF may provide access to the slice object by sending the slice object via a communication protocol information element, such as Diameter Attribute Value Pairs (AVPs).

The slice object may comprise non-modifiable properties. Such non-modifiable properties may inform the CAS of corresponding properties of the network slice, and may thereby enable the CAS to monitor the network slice, e.g., if the SREF keeps the slice object updated to reflect the current properties of the network slice.

The slice object may also comprise one or more modifiable properties. Each modifiable property of the slice object may correspond, e.g., directly or indirectly via a generalization, to one or more modifiable properties of the corresponding network slice. A specific example is that the slice object may comprise a bandwidth capacity property having a value which represents the current bandwidth capacity of a RAN, with the value being modifiable by the CAS. A modification by the CAS may then effectively represent a request of the CAS to effect a change in or relating to the property. If such a modifiable property is modified, the SREF may translate the change into a request which may be sent to the at least one slice management network function. For example, the bandwidth capacity of a RAN may be changed by sending a request to the orchestrator of the virtual infrastructure to change the capacity of the multiple links connecting the user plane core network functions to the wireless access points.

It will be appreciated that while the above refers to the example of the bandwidth capacity of a RAN, various other types of modifiable and non-modifiable properties of network slices may be exposed to the CAS in the manner as claimed. Non-limiting examples of such properties are given elsewhere in this specification.

The SREF may, by generating and providing access to the slice object, provide an interface between the CAS and slice management network function(s) which may enable the CAS to learn about and at least in part manage a network slice without being exposed to the complexity of the network slice and its management. In other words, SREF may enable the CAS to perform slice management, while at the same time reducing the complexity of the slice management for the CAS. The SREF may address disadvantages of the CSMF [2] by providing an interface for the CAS to the slice management network function(s) and by enabling at least partial management of the network slice by the CAS, e.g., via one or more modifiable properties.

In the specific example of a 5G network, the SREF may be used to provide new functionality at the management layer of the 5G network. The SREF may interface with the 3rd party CAS and with the CSMF, NSMF and NSSMF and provide an API to the 3rd party CAS to manage and monitor the network slice where its services are running. Upon authentication of the CAS with the 5G network, the SREF may identify and expose one or a set of APIs that the 3rd party CAS is allowed to use. The SREF may effectively abstract the 3GPP network as one or more Network Slice Subnets (NSS) upon which 3rd parties may build their own slices containing own network (application) functions. The SREF may thereby contain all the 3GPP complexity within its own domain (the NSS) and provide 3rd parties with simpler deployment options.

Function names such as SREF are descriptive names but do not necessarily imply limitations other than those claimed and/or described. The term 'resource' in SREF may refer to the SREF exposing and enabling the CAS to manage resources of the network slice, e.g., computing, storage or bandwidth resources.

The following embodiments relate to the processor system of the SREF.

In an embodiment, the processor system may be configured to enable the content application server (CAS) to access the slice object and/or to modify the modifiable object property of the slice object via an application programming interface (API). By providing access to the properties of the network slice via an API, one or more of the requirements of 3GPP TS 22.261 [1] may be directly addressed.

In an embodiment, the application programming interface (API) may comprise a set of functions which include at least a function for modifying the modifiable object property, and the processor system may be configured to expose the set of functions of the application programming interface to the content application server (CAS). The API may provide a set of functions for modifying modifiable object properties. To enable the CAS to learn about the set of functions, the SREF may be configured to expose the set of functions to the CAS, e.g., upon authentication of the CAS directly to the SREF or indirectly via another entity in the communication network.

In an embodiment, the set of functions may further comprise at least one of:
a function for requesting a network slice to be instantiated;
a function for requesting a network slice to be removed.

In addition to comprising functions for modifying properties of a network slice, the set of functions may also comprise a function which enables the CAS to request a network slice to be instantiated and a function which enables a network slice to be removed. For example, the former type of function may enable the CAS to request instantiation of a network slice which has one or more desired properties.

In an embodiment, the communication network may further comprise one or more traffic control network functions for controlling traffic in network slices, and the slice object may comprise at least one further modifiable object property which represents one or more properties of the network slice which are associated with traffic control by the one or more traffic control functions. In addition to interfacing between the CAS and slice management network function(s), the SREF may also interface between the CAS and traffic control function(s). An example of a traffic control function is a control plane traffic routing function (CPTRF). The type of interface may be similar, in that the slice object may be generated to comprise an abstraction of properties which relate to the traffic control by said traffic control functions. Such traffic-related properties may, but do not need to be modifiable. In case a modifiable traffic-related property is modified, the SREF may send a request to at least one traffic control function to request a corresponding change in the traffic control.

In an embodiment, the processor system may be configured to determine an authorization level of the content application server (CAS), and depending on the authorization level of the content application server, configure at least one of:
which object properties are included in the slice object,
which object properties of the slice object are modifiable, and
which property value of the modifiable object property is selectable, by the content application server.

The SREF may employ an authorization mechanism whereby the CAS, depending on its authorization level, may only modify select object properties, and/or may select only select values for modifiable object properties. The latter refers to the selection of property values being limited based on the authorization level. For example, in case of a basic authorization level, the CAS may only select and thereby request bandwidth capacities which are relatively low, e.g., below a predetermined value. Higher values for bandwidth capacities may not be selectable. This may allow the SREF to offer different levels of slice management to different third parties.

In an embodiment, the processor system may be configured to:
determine if one or more properties of the network slice have changed;
change the slice object in accordance with said change; and
notify the content application server (CAS) that the slice object property has changed.

The SREF may update the slice object in accordance with changes in properties of a corresponding network slice. The object properties of the slice object, e.g., their quantity, type and/or value, may thus reflect such changes in slice properties. To alert the CAS to such changes, the SREF may notify the CAS. Thereby, the CAS may monitor the network slice as it is notified of changes in the network slice.

In general, the SREF may be implemented as a separate function, or may be implemented as part of the CSMF or the NSMF or the NSSMF or the CAS.

In an embodiment, the slice object may comprise at least one of:
- an object property identifying a radio access network (RAN);
- an object property identifying a data network (DN);
- an object property identifying a subscription management function;
- an object property identifying a traffic control function;
- an object property identifying a policy control function; and
- an object property identifying a mobility management function.

The following embodiment relates to the processor system of the CAS.

In an embodiment, the processor system may be configured to access the slice object and/or to modify the modifiable object property of the slice object via an application programming interface (API) provided by the network function (SREF).

In an embodiment, the communication network may be a telecommunication network. In an embodiment, the communication network may comprise a core network, e.g., of a connectivity provider's network.

In an embodiment, the connectivity provider's network may be a network adhering to one or more 3GPP standards.

It will be appreciated by those skilled in the art that two or more of the above-mentioned embodiments, implementations, and/or aspects of the invention may be combined in any way deemed useful.

Modifications and variations of any one of the processor systems, networks and network nodes, methods and/or the computer programs, which correspond to the described modifications and variations of another one of these entities, and vice versa, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings, FIG. 1 provides a schematic view of a prior art 3GPP communication network which is configured to enable instantiation of network slices and which comprises slice management network functions (CSMF, NSMF, NSSMF) for management of the network slices, wherein a content application server (CAS) is connected via a data network (DN) to the communication network and configured to provide an application service via a network slice to at least one user equipment (UE).

Figure 1:
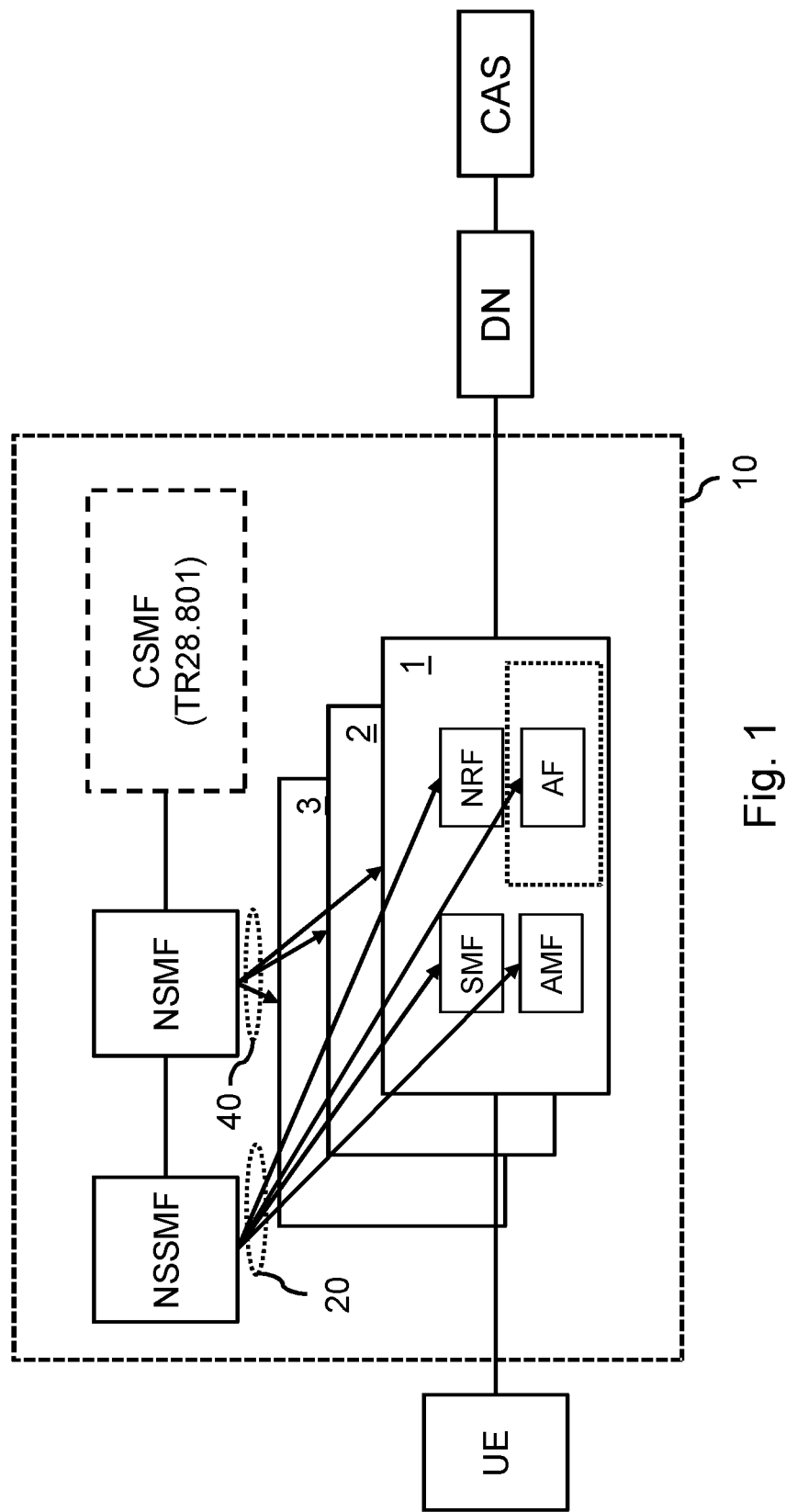

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

AF application function
AMF access and mobility management function
API application programming interface
CAS content application server
CP control plane
CPTRF control plane traffic routing function
CSMF communication service management function
DANE DASH aware network element
DASH dynamic adaptive streaming over HTTP
DN data network
LDM local dynamic map
NRF network repository function
NSMF network slice management function
NSSMF network slice subnet management function
PDU protocol data unit
RAN radio access network
REST representational state transfer
SMF session management function
SREF slice resource exposure function
UDM unified data management function
UE user equipment
UP user plane
VAF video aggregator function
1-3 network slice
10 communication network
20 data for network slice subnet management by NSSMF
40 data for network slice management by NSMF
100 data communication for network slice subnet management and monitoring between CAS and SREF
120 data communication for network/slice management and monitoring between CAS and SREF
200-205 slice object
300-305 network slice
310 control plane function(s)
320 user plane function(s)
330 compute resources
340 storage resources
350 video aggregator function
360 unified data management
370 control plane traffic routing function
380 DASH aware network element
390 local dynamic map function 400 system representing network node
410 network interface
420 processor (sub)system
430 storage
500 computer readable medium
510 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

The following embodiments are described in the context of a telecommunication network adhering to one or more 5G 3GPP standards. However, the concepts described in the following embodiments may equally apply, mutatis mutandis, to any other type of communication network capable of instantiating virtual networks and/or network slices and having slice management network functions capable of performing the functions as defined by the wording of the claims.

Prior Art Network

FIG. 1 provides a schematic view of a prior art 3GPP communication network 10 which is configured to enable instantiation of network slices. By way of example, FIG. 1 shows three network slices 1-3 having been instantiated. The communication network 10 is shown to comprise a network slice subnet management function (NSSMF) and a network slice management function (NSMF) for management of the network slices 1-3. Network slice 1 is instantiated to comprise a session management function (SMF), an access and mobility management function (AMF), network repository function (NRF) and an application function (AF). Management of the network slices is conceptually represented in FIG. 1 by arrows 20 between the NSSMF and the SMF, AMF, NRF and AF, and arrows 40 between the NSMF and the respective network slices 1-3, with such arrows representing data communication. FIG. 1 further shows a communication service management function (CSMF) as defined by [2].

FIG. 1 further shows a content application server (CAS) being connected via an (external) data network (DN) to the communication network 10 and configured to provide an application service via network slice 1 to a user equipment (UE).

Conceptual Overview

Figure 2:
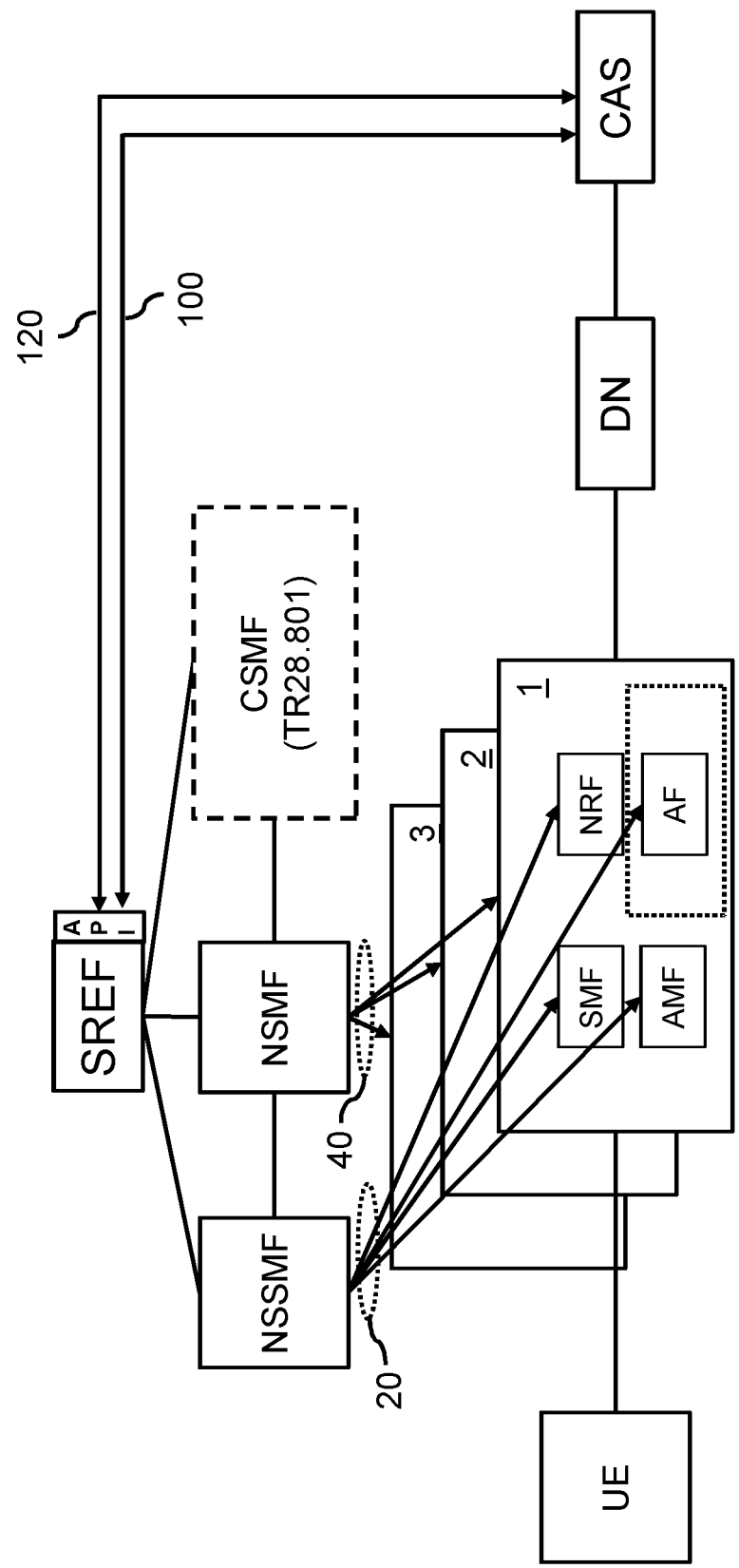
FIG. 2 is based on FIG. 1 but additionally shows a network function (SREF) providing an interface between the CAS and the slice management network functions (CSMF, NSMF, NSSMF) to enable the CAS to manage the network slice.

FIG. 2 provides a schematic and conceptual overview of an embodiment in which a slice resource exposure function (SREF) is provided which may be configured to communicate with the NSSMF, the NSMF and the CSMF, and which may be accessible to the CAS via data communication 100, 120. The SREF may enable the CAS to at least in part manage network slice 1 by the SREF being configured to generate an abstraction of properties of network slice 1 in the form of a data structure representing a slice object, and expose the properties of network slice 1 to the CAS by providing access to the slice object. The slice object may comprise at least one modifiable object property representing one or more properties of network slice 1 which may be managed by at least one of the slice management functions NSSMF, NSMF, CSMF. The SREF may be further configured to enable the CAS to modify the modifiable object property to obtain a modified object property, and based on the modified object property, send a request to the at least one of the slice management network functions to request a corresponding modification of the one or more properties of network slice 1. The data communication between the SREF and CAS may be based on an application programming interface (API) and may pertain to network slice subnet management and monitoring (reference numeral 100) and network and/or slice management and monitoring (reference numeral 120).

Various examples of slice objects are discussed with reference to FIGS. 3-8, whereas the exposing of the properties of the slice object and of functions associated with the modification of the slice object and other types of functions will be discussed with reference to an example using representational state transfer (REST) APIs.

Detailed Embodiments

With continued reference to FIG. 2, in some embodiments, the SREF may enable the CAS to instantiate a network slice having one or more desired properties. This may involve the following steps, e.g., to instantiate network slice 1:

1. The 3rd party CAS may contact the SREF with a request to set up a network slice for its application services, e.g., via data communication 100, 120.
2. The SREF may communicate with the appropriate functions of the 5G network to authenticate the requesting 3rd party CAS.
3. Upon successful authentication of the 3rd party CAS, the SREF may expose the following to the 3rd party CAS:
   a. An object describing the slice offered to the 3rd party CAS, e.g., a slice object, which in some embodiments may also simply be an empty template for the slice object, e.g., having only property names and no values set for the properties.
   b. A list of functions that the 3rd party CAS may use to customize the network slice and/or a list of properties of the slice object that can be customized. It is noted that such customization of property values is a form of modification of the slice.
4. The 3rd party CAS may return an object where values for all, or at least part of the customizable properties are specified. Alternatively, the 3rd party CAS may call the customization functions to change the values of the slice properties.
5. The SREF may translate the properties of the slice object into slice requirements, possibly via the CSMF [2].
6. The SREF may receive confirmation from the network, possibly via the CSMF, that the slice with those requirements has been instantiated.
7. The SREF may communicate this information to the CAS.

Figure 3:
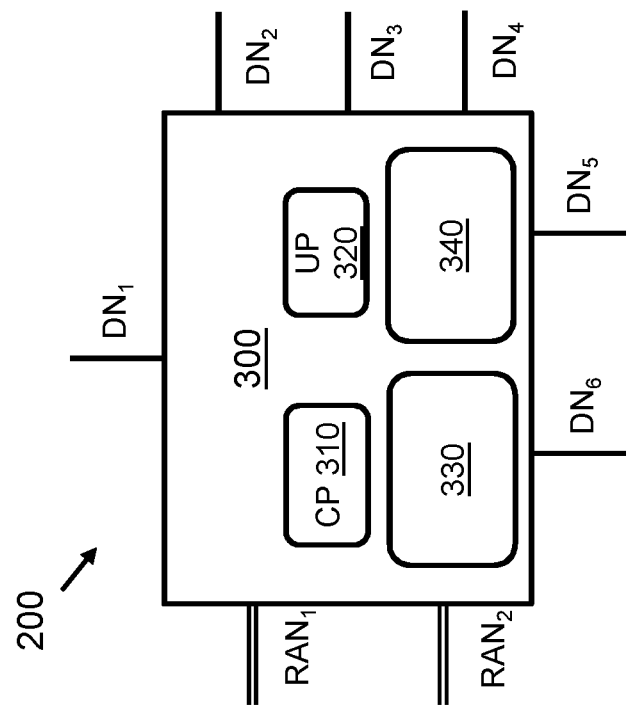
FIG. 3 is a visual representation of a slice object made accessible to the CAS.

FIG. 3 shows a visual representation of a slice object 200 which may be made accessible to the CAS and which may represent a network slice 300. The slice object 200 may have a number of properties representing an abstraction of properties of the network slice 300, for example a number of RAN links, a number of DN links, properties indicating an ability to provide computing resources 330 and/or storage resources 340, access to control plane functions 310, access to user plane functions 320, etc. For each RAN/DN links, further properties may include: link location, capacity (up/down) and estimated latency between RAN/DN link pair. Alternatively, an aggregate RAN/DN capacity or latency value may be provided. The computing and storage resources 330, 340 may for example represent network functions of the 5G network or separate resources attached to the DN links that may perform application specific processing. In some embodiments, not all control or user plane functions may be exposed for access to the CAS, but only necessary ones. For example, if an application needs access to mobility events, the AMF endpoint from FIG. 2 may be exposed to the CAS, while the SMF may not be exposed to the CAS.

An example of a data structure representing the slice object 200 may be:

```
Slice s = {
    RAN ran1 = {location, bw_capacity, latency}
    RAN ran2 = {location, bw_capacity, latency}
    DN dn1 = {location, bw_capacity, latency}
    DN dn2 = {location, bw_capacity, latency}
    DN dn3 = {location, bw_capacity, latency}
    DN dn4 = {location, bw_capacity, latency}
    DN dn5 = {location, bw_capacity, latency}
    DN dn6 = {location, bw_capacity, latency}
    Comp c = {speed, latency_ran1, latency_ran2}
    Storage st = {st_capacity, latency_ran1, latency_ran2}
}
```

API Example Using REST

The slice object, and in particular its properties, may be exposed by the SREF to the CAS using an API. A specific example of an API may be the following, which is explained based on REST APIs which are commonly used in webservices and are stateless. This may comprise the CAS needing to authenticate itself at every request. However, when using stateful APIs or any form of encrypted communication (e.g. HTTPs) the CAS may not need to authenticate itself at every request.

The SREF may offer a function to the CAS that returns a list of functions to the CAS which the CAS is allowed to use, e.g.:

GET {resource} HTTP/1.1
Host: 5Gprovider.com

The name of the resource to request may for example comprise: / or/functionalities or /{CAS}/functionalities
where {CAS} may identify the base URL for a specific CAS (e.g., Netflix, BBC, etc.). Additionally, the CAS may need to append a form of authentication information, e.g. by using the Authorization tag of the HTTP header message:

Authorization: Basic Qwerty

Using a more advanced authentication mechanism, e.g., by means of hash-based message authentication (HMAC), the CAS may provide a username and a digest obtained by hashing concatenated information, such as a timestamp and a requested resource:

digest=base64encode(hmac("sha256",
"concatonated_info", "1545215617GET/{CAS}/functionalities"))

In this case, the CAS may send the following request to the SREF:

GET /{CAS}/functionalities HTTP/1.1
Host: 5Gprovider.com
Authentication: hmac {username}:[digest]
where username identifies the CAS, e.g. Netflix, BBC, etc.

The SREF may verify the request, and if the CAS is recognized, the SREF may reply with an HTTP message whose body contains, in a structured format, e.g. in a JSON format, the list of functionalities exposed to the CAS:

```
HTTP/1.1 200 OK
{
"slice" : {
    "cardinality": "N"
    "id": "name"
    "parameters":
    {
        "RAN": {
        "cardinality": "N"
        "id": "name"
        "parameters": {
            "location": "geo_area"
            "bw_capacity_up": "mbps"
            "bw_capacity_down": "mbps"
        }
        }
        "DN": {
        "cardinality": "N"
        "id": "name"
        "parameters": {
            "location": "geo_area"
            "bw_capacity_up": "mbps"
            "bw_capacity_down": "mbps"
        }
        }
        "UDM": {
        "cardinality": "1"
        "parameters": {
            "charging_characteristics": "value"
        }
        }
        "user_functions": {
        "cardinality": "N"
        "id": "name"
        "parameters": {
            "cpus": "value"
            "mgmt_access_endpoint": "value"
            "ue_access_endpoint": "value"
        }
        }
    }
}
"get_slice_status": {"slice_id": "value"}
"remove_slice": {"slice_id": "value"}
"get_RAN_status":
{
"slice_id": "value"
"ran_id": "value"
}
}
"update_RAN":
{
"slice_id": "value"
"ran_id": "value"
"parameters": {
    "location": "geo_area"
    "bw_capacity_up": "mbps"
    "bw_capacity_down": "mbps"
}
}
"remove_RAN":
{
"slice_id": "value"
"ran_id": "value"
}
"get_DN_status":
{
"slice_id": "value"
"dn_id": "value"
}
"update_DN":
{
"slice_id": "value"
"dn_id": "value"
parameters: {
```

```
         "location": "geo_area"
         "bw_capacity_up": "mbps"
         "bw_capacity_down": "mbps"
      }
   }
   "remove_DN":
   {
   "slice_id": "value"
   "dn_id": "value"
      }
   "get_user_function_status":
   {
   "slice_id": "value"
   "user_function_id": "value"
      }
   "add_user_function":
   {
   "slice_id": "value"
   "user_function_id": "value"
   parameters: {
         "cpus": "value"
            "mgmt_access_endpoint": "value"
            "ue_access_endpoint": "value"
         }
      }
   "change_user_function":
   {
   "slice_id": "value"
   "user_function_id": "value"
   parameters: {
         "cpus": "value"
            "mgmt_access_endpoint": "value"
            "ue_access_endpoint": "value"
         }
      }
   "remove_user_function": {
   {
   "slice_id": "value"
   "user_function_id": "value"
      }
   }
}
```

The above response indicates that the CAS may instantiate a network slice where the CAS may set a list of RAN points and DN points along with their characteristics, where the CAS has access to the UDM's charging characteristics function, and where the CAS can add a number of user plane functions to the slice.

Figure 4:
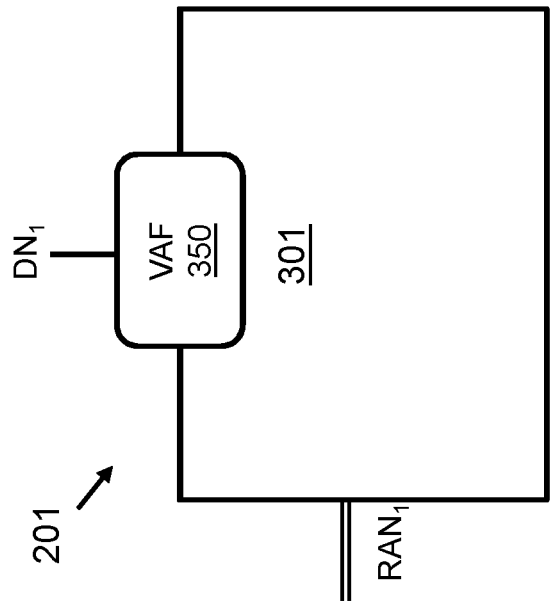
FIG. 4 is a visual representation of a slice object made accessible to the CAS for a network slice which comprises a video aggregator function (VAF)

FIG. 4 shows a visual representation of a slice object 201 made accessible to the CAS for a network slice 301 which comprises a video aggregator function (VAF) 350. This example relates to a video production use case, where a number of cameras are deployed at a location (e.g., concert or football match) and have a 5G connection to the operator network. The service provider may wish each camera to have a specific uplink bandwidth and may wish a video aggregator service to be deployed in the operator network which combines the video feeds of the different cameras and produces one stream as output, which may then be sent out to the service provider's studio for further distribution to users. This use case may involve the following:

1. The CAS may authenticate to the operator network and may communicate to the SREF the following information:
   a. The desired upload bandwidth for a specific RAN link
   b. The bandwidth of the aggregated stream coming out of the video aggregator and the DN link which will be used for this stream (it is noted that the video aggregator is a data plane function)
   c. The processing capacity needed by the video aggregator function With further reference to the REST APIs example, the CAS may instantiate a new slice called "s" as follows:

```
POST /video_production_provider1/s
Host: 5Gprovider.com
Authentication: hmac video_production_provider1:[digest]
Content-Type:text/xml
{
   Slice:
   {
      "id": "s"
      "RAN":
      {
         "ran_id": "ran1"
         "parameters":
         {
            "location": "geo_area"
            "bw_capacity_up": 500000000
            "bw_capacity_down": 10000000
         }
      }
      "DN":
      {
         "dn_id": "dn1"
         "parameters":
         {
            "location": "geo_area"
            "bw_capacity_up": 100000000
            "bw_capacity_down": 5000000
         }
      }
      "VideoAggregationFunction":
      {
         "user_function_id": "vaf"
         "parameters:
         {
            "cpus": 20
            "mgmt_access_endpoint": "value"
            "ue_access_endpoint": "value"
         }
      }
   }
}
```

2. The SREF may assess whether a network slice for this service exists, whether it has enough capacity (bandwidth, storage, computational) to fulfil the request and whether the CAS is authorized to make such a request. In case of using virtual infrastructure and orchestration according to the ETSI NFV standards, a network slice may correspond to a "Network Service". The above may then be carried out using the NS Lifecycle Management interface specified in ETSI GS NFV-IFA 013. In order to assess whether a slice for the service exists, the SREF may uses the "Query NS" operation and provide the service name "Video Production". If the slice exists, the SREF may also assess the slice's performance using the NS Performance Management interface "Query PM Job" operation providing the name of the PM Job "VP_perf_job" that was created when the slice was instantiated. The results of these two operations may be used to assess whether a new slice needs to be instantiated. If so, the SREF may use the "Instantiate NS" operation and translate the parameters received from the CAS into the input ones used by the operation. An example of this mapping may be vaf mgmt_access_endpoint and vaf ue_access_endpoint to sapData, dn1 location to locationConstraints, vaf cpus to additionalParamForVnf, etc. Alternatively, for other types of virtual infrastructures, similar operations with the same/similar type of input/output may be used instead.

3. The SREF may communicate the result of the assessment back to the CAS and construct an abstraction slice object (also visualized in FIG. 4):

```
Slice s = {
    RAN ran1 = {location, bw_capacity}
    DN dn1 = {location, bw_capacity}
    VideoAggregatorFunction vaf = {cpus, mgmt_access_endpoint,
ue_access_endpoint}
}
```

4. In case of a positive assessment by the SREF, the video production service may start. The CAS may access the Video Aggregator Function (VAF) via the management access endpoint specified in the slice object and deploy application software. The CAS may also configure the cameras to send all streams to the VAF by using the UE access endpoint specified in the slice object. The access endpoints may be any form of identification that allows access to the video aggregator function, e.g., an IP address.

5. If, during the execution of the video production service, cameras are added or cameras are removed (e.g., switched off), the SREF may decide whether to increase/decrease capacity (bandwidth, storage, computational) by using the NS Lifecycle Management interface "Update NS" operation with update type ModifyVnfInformation and inform the CAS accordingly (in case, this may have business implications such as more or less costs to be charged, e.g., as earlier agreed between the operator and the CAS). The parameters provided by the SREF may be the new bandwidth/storage/compute constraints for the VAF in the modifyVnfInfoData operation input.

It is also possible that such changes are left to the CAS to be decided instead of the SREF. For example, the CAS may issue a status request on the RAN ran1 resource of slices instantiated in step 2:

GET/video_production_provider1/s/ran1/status
Host: 5Gprovider.com
Authentication: hmac video_production_provider1:[digest]

and receive the following response from the SREF:
HTTP/1.1 200 OK

```
{
"ran_id": "ran1"
    {
    "parameters":
        {
        "location": "geo_area"
        "bw_up": 450000000
        "bw_down": 5000000
        }
    }
}
```

Comparing these values with the values bw_capacity_up and bw_capacity_down provided in step 2, the CAS may for example notice that the bw_capacity_up is saturated and may decide to issue the following request to the SREF:

PUT/video_production_provider1/s/ran1
Host: 5Gprovider.com
Authentication: hmac video_production_provider1:[digest]

```
{
"ran_id": "ran1"
    {
    "parameters":
        {
        "location": "geo_area"
        "bw_capacity_up": 700000000
        "bw_capacity_down": 10000000
        }
    }
}
```

If the SREF accepts the request, it may reply with a HTTP/1.1 200 OK.

6. When the service is terminated, e.g. at the end of the event being filmed, the CAS may communicate this to the SREF, which may then instruct the network to release the resources that the CAS' service was using. This may be done by using the "Terminate NS" operation providing the NS instance ID received during creation. With reference to the REST embodiments above, the CAS may send the following request:
DELETE/video_production_provider1/s
Host: 5Gprovider.com
Authentication: hmac video_production_provider1:[digest]

If the SREF accepts the request, it may reply with a HTTP/1.1 200 OK.

Figure 5:
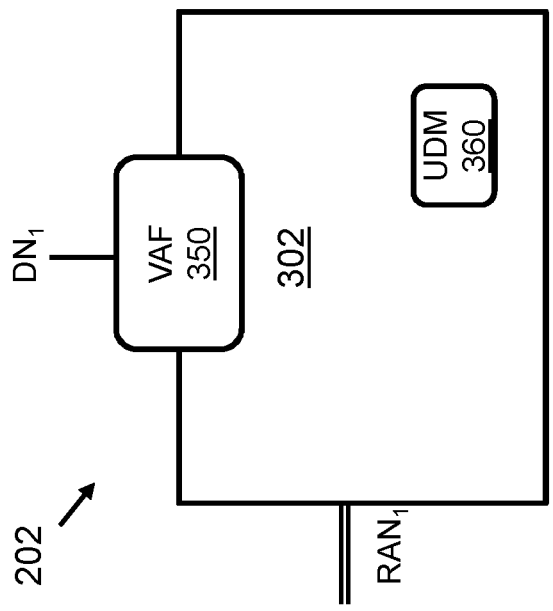
FIG. 5 is a visual representation of a slice object for a network slice which comprises a video aggregator function (VAF) and a unified data management (UDM) control plane function.

FIG. 5 shows a visual representation of a slice object 202 for a network slice 302 which comprises a video aggregator function (VAF) 350 and a unified data management (UDM) control plane function 360. This example relates to a use case in which a service provider would like to manipulate (part of) the subscription data for its users when using the slice for professional video production. This may involve:

1. Firstly, an instantiated slice that can be represented as the slice object 202 from FIG. 5 is assumed to already exists (see also step 5).
2. The CAS may authenticate to the operator network and send a message to the SREF requesting an interface to manage the subscription level data of its subscribers. With reference to the REST API embodiments, the CAS may send a request asking for the functionalities which it is allowed to use:
GET/video_production_provider1/functionalities
HTTP/1.1
Host: 5Gprovider.com
Authentication: hmac video_production_provider1:[digest]
3. The SREF may assess whether the CAS is authorized to make such a request.
4. Depending on the result of this assessment, the SREF may either expose a limited or full interface to the UDM to the CAS, or the request may be denied. The interface to the UDM may be exposed to the CAS by modifying the slice object to include a UDM function and its mgmt_access_endpoint that the CAS may use to access and modify subscription data. It is also possible that this UDM function is not the actual 5G UDM function that the network operator uses containing all subscription data but a smaller UDM function created and deployed only in order to expose subscription data access to third parties. It may also be a subfunction of the NEF.

In order to modify the slice and include the new function, the SREF may use the NS Lifecycle Management interface "Update NS" operation with updateType InstantiateVnf and provide the NS Instance ID that needs to be changed. The instantiateVnfData parameter of the operation may contain the vnfType=UDM and the mgmt_access_endpoint.

5. If the request is accepted, the SREF may communicate this to the CAS, possibly by providing the new slice object (as also visualized in FIG. 5):

```
Slice s = {
    RAN ran1 = {location, bw_capacity}
    DN dn1 = {location, bw_capacity}
    UDM udm = {mgmt_access_endpoint}
    VideoAggregatorFunction vaf = {cpus, mgmt_access_endpoint,
    ue_access_endpoint}
}
```

Alternatively, the SREF may reply only with the mgmt_access_endpoint of the UDM or a UDM object instead of the whole new slice object.

6. The CAS may then use the mgmt_access_endpoint to access and modify the subscription data in the UDM.

Figure 6:
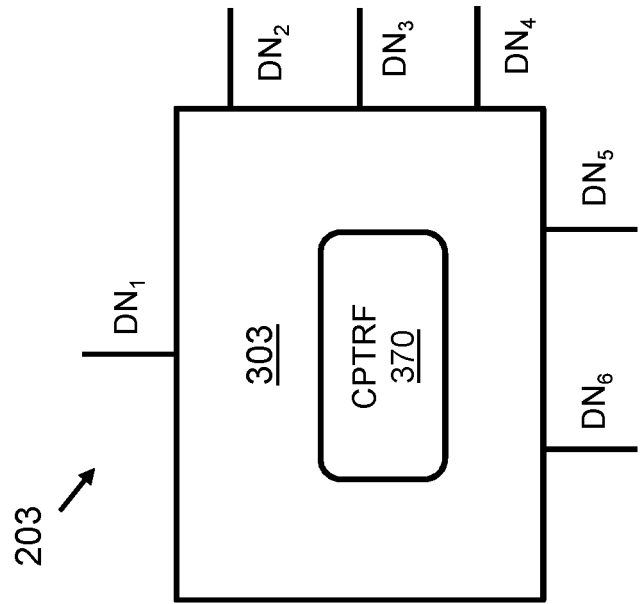
FIG. 6 is a visual representation of a slice object for a network slice which comprises a control plane traffic routing function (CPTRF)

FIG. 6 shows a visual representation of a slice object 203 for a network slice 303 which comprises a control plane traffic routing function 370 (CPTRF). This example relates to a use case in which a service provider would like to offer a streaming service to end-users, while at the same time performing load balancing among the CDN nodes which stream the content to the end-users. This may involve:

1. The CAS may authenticate to the operator network and communicate the expected aggregated bandwidth for content delivery at a given time to the SREF.
2. The SREF may assess whether an existing slice has enough bandwidth capacity to fulfil the request or whether a new slice needs to be instantiated. The slice object may look as follows (as also visualized in FIG. 6):

```
Slice s = {
    DN dn1 = {location, bw_capacity}
    DN dn2 = {location, bw_capacity}
    DN dn3 = {location, bw_capacity}
    DN dn4 = {location, bw_capacity}
    DN dn5 = {location, bw_capacity}
    DN dn6 = {location, bw_capacity}
    CPTRF cptrf = {access_endpoint}
}
```

3. The SREF may communicate the results of the assessment back to the CAS as well as the slice object representing the virtual network which, as indicated above, also includes an access endpoint to a control plane function that the CAS can use to influence traffic routing in the 5G network.
4. In case of a positive assessment, the streaming service may start.
5. During the execution of the service, the CAS may ask for the status (e.g., bandwidth used vs bandwidth left) of each link going from the operator network to one of the CDN nodes of the CAS ($DN_1$ to $DN_6$ in FIG. 6). The SREF may assess this by using the NS Performance Management interface "Query PM Job" operation while providing the name of the PM Job "VP_link_perf_job" that was created when the slice was instantiated to the NFV Orchestrator from the NFV MANO infrastructure. After the orchestrator provides the performance data for all the links, the SREF may filter only the data requested by the CAS and may send back the results.
6. If one of the links is almost saturated, the CAS may do one of the following:
   a. Ask the SREF to redirect the traffic from the saturated link to a less congested one, if any is available. The SREF effect such redirection using the Change External VNF Connectivity operation from the VNF Lifecycle Management of the VNF Manager. For example, the saturated link may be replaced by a larger capacity link by providing the VNF instance ID for each 5G VNF hosting the DN and the new target links in each extVirtualLink parameter.
   b. Ask the SREF to extend the capacity of the saturated link. The SREF may do this by using the Change External VNF Connectivity operation from the VNF Lifecycle Management of the VNF Manager. The saturated link may be expanded by changing the capacity link parameters with the same operation as under a) but using the extCp attribute of the extVirtualLink parameter.
   c. Redirect the user to another CDN node which will be reachable via another, less congested, link. The CAS may do this with application specific redirects by communicating to the UE, or by using the Control Plane Traffic Routing Function (CPTRF) access endpoint and send a request to redirect specific user or multiple users to different DNs. In this case the CPTRF may be an AF implementing the Application Influence on Traffic Routing feature specified by 3GPP in TS 23.501, clause 5.6.7.
7. Similarly, if the CAS later receives a status message from the SREF indicating lower usage of one or more different links, the CAS may decide to decrease the capacity of those links. It is also possible that the SREF may decide to decrease the capacity and only to notify the CAS.

Figure 7:
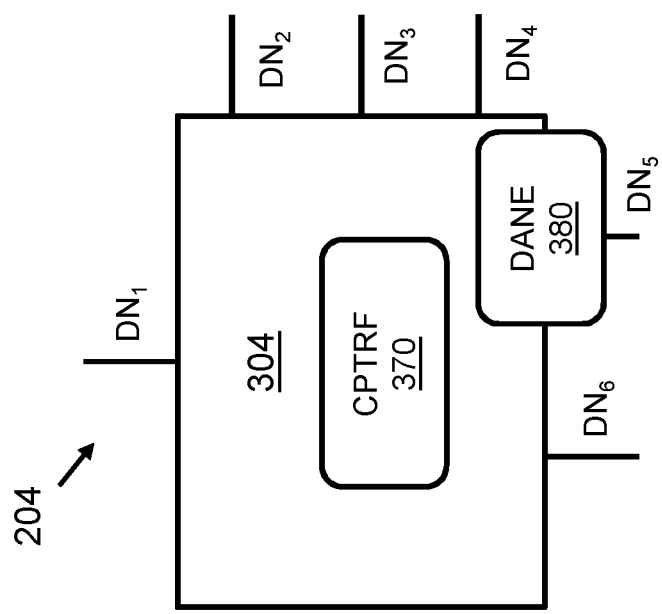
FIG. 7 is a visual representation of a slice object for a network slice which comprises a control plane traffic routing function (CPTRF) and a DASH (Dynamic Adaptive Streaming over HTTP) Aware Network Element (DANE)

FIG. 7 shows a visual representation of a slice object 204 for a network slice 304 which comprises a control plane traffic routing function (CPTRF) 370 and a DASH Aware Network Element (DANE) 380. This example relates to a use case in which a service provider would like to offer network assistance (as in 3GPP SAND) to (a subset) of its DASH streaming users. This may involve:

1. The service may run on top of an already instantiated slice that can be represented as the slice object 204 from FIG. 7 and exposed to the CAS.
2. The CAS may authenticate to the operator network and send a request to the SREF containing:
   a. A type of function to be deployed in the slice, e.g., a DANE (SAND server)
   b. The location of the function, e.g., DN5
3. The SREF may assess whether the slice has enough computing/storage capacity to fulfil the request and whether the CAS is authorized to make such a request. The SREF may assess this by using the NS Lifecycle Management interface "Query NS" operation to the NFV Orchestrator from the NFV MANO infrastructure and the NS Performance Management interface "Query PM Job" operation providing the name of the PM Job "VP_perf_job" that was created when the slice was instantiated.

4. The SREF may deploy a DANE by using the NS Lifecycle Management interface "Update NS" operation with updateType InstantiateVnf and communicate the results of the assessment back to the CAS, along with the management and UE access endpoint of the DANE to the CAS. The slice object may be updated with the DANE function and may look as follows (as also visualized in FIG. 7):

```
Slice s = {
  DN dn1 = {location, bw_capacity}
  DN dn2 = {location, bw_capacity}
  DN dn3 = {location, bw_capacity}
  DN dn4 = {location, bw_capacity}
  DN dn5 = {location, bw_capacity}
  DN dn6 = {location, bw_capacity}
  CPTRF cptrf = {access_endpoint}
  DANE dane= {cpus, mgmt_access_endpoint, ue_access_endpoint}
}
```

5. In case of a positive assessment, the CAS may communicate to its end-user applications that a DANE is present in the network and how it can be reached by using the ue_access_endpoint specified in the slice object. The CAS may also access the DANE and deploy software or configuration by using the management access endpoint specified in the slice object.
6. When no end-user application is making use of the DANE anymore (e.g., no PDU sessions going to the DANE IP/port), the SREF may inform the CAS which in turn may decide to ask the SREF to remove the DANE from the slice. The SREF may be aware of the DANE usage by using the VNF Performance Management interface and either periodically query the port traffic or subscribing to be notified in case of no traffic. Alternatively, in a variant with higher level of management (meaning less control in the CAS), the network may decide to remove the DANE without waiting for the request of the CAS, and afterwards inform the CAS about the removal.

Figure 8:
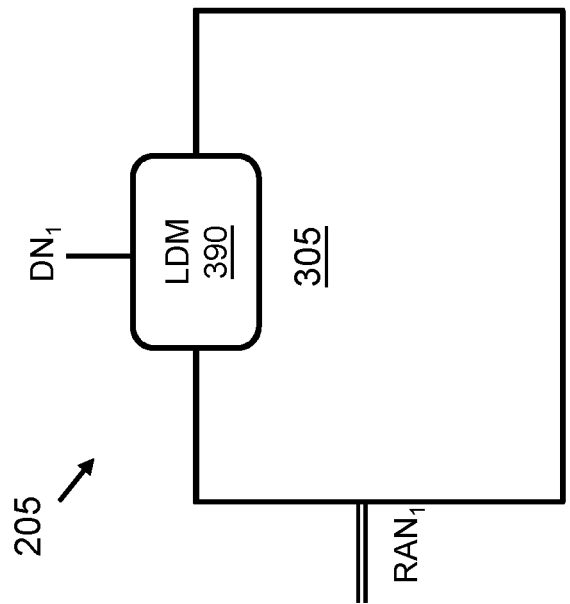
FIG. 8 is a visual representation of a slice object for a network slice which comprises a local dynamic map (LDM) function.

FIG. 8 shows a visual representation of a slice object 205 for a network slice 305 which comprises a local dynamic map (LDM) function 390. This example relates to a use case in which an automotive service enriches the drivers' experience with 'beyond line of sight' sensor information. The sensor information provided by the automotive service to the drivers may be raw or processed, e.g., comprising detected events on the road such as a collision. Providing the automotive service may involve:
1. The CAS may authenticate to the operator network and communicate to the SREF:
   a. The latency to be provided by a specific RAN link
   b. The aggregated bandwidth in uplink and downlink on the RAN link
   c. The processing capacity needed by a sensor fusion user function, e.g., a local dynamic map (LDM) function
2. The SREF may assess whether a slice for this service exists, whether it has enough capacity (bandwidth, latency, storage, computational) to fulfil the request and whether the CAS is authorized to make such a request. In case of using virtual infrastructure and orchestration according to the ETSI NFV standards a network slice may correspond to a "Network Service" and this can be done by using the "Query NS" and "Instantiate NS" operations from the NS Lifecycle Management interface specified in ETSI GS NFV-IFA 013. Furthermore, the performance management of the current service may be checked by using the NS Performance Management interface "Query PM Job" operation for a performance job that was previously created with the specified monitored parameters. Alternatively, in case of other virtual infrastructures, similar operations with the same input/output may be used.
3. The SREF may communicate the result of the assessment back to the CAS and construct an abstraction object as follows (as also visualized in FIG. 8):

```
Slice s = {
  RAN ran1 = {location, bw_capacity}
  DN dn1 = {location, bw_capacity, latency}
  LDM ldm = {cpus, mgmt_access_endpoint, ue_access_endpoint}
}
```

4. In case of a positive assessment, the service can start. The CAS may access the LDM 390 via the management access endpoint specified in the slice object and deploy any application software needed, such as sensor fusion, collision detection, etc. The access endpoints may be any form of identification that allows access to the function, e.g., an IP address.
5. If during the execution of the service more cars are added or removed (e.g. moving in/out of range of the same RAN), the SREF may decide whether to increase/decrease capacity (bandwidth, storage, computational) by using the NS Lifecycle Management interface "Update NS" operation and inform the CAS accordingly. It is also possible that this is left for decision to the CAS instead of being decided by the SREF.
6. When the service is terminated (e.g. no more cars in range of a certain RAN), the CAS may communicate this to the SREF, which may then instruct the network to release the resources that the CAS' service was using.

In general, one CAS may instantiate multiple slice instances, of the same type or of different types. The SREF may check whether the CAS is authorized to do so and if it has a limit (e.g., in terms of type of slices and/or number of slices).

When instantiating a slice, a CAS may indicate the slice type (eMBB, URLLC, mMTC). This may be done by, for example, adding a new parameter in the slice object returned by the CAS to the SREF, e.g., Type type="eMBB"

When instantiating a slice, a CAS may indicate a priority for the slice. The priority may be relative to the slices of the same CAS, or absolute (across different CASs). This may be done by, for example, adding a new parameter in the slice object returned by the CAS to the SREF, e.g., "priority": 10

The slice type, slice priority and limit may be useful for a service provider who may need more than one slice (type) to support its service. For example, an automotive service provider may wish to instantiate two slices, one for mission critical services as described above with reference to the 'sensor-enriched driving service slice management' example, and one for 'infotainment' on-board services as described above with reference to the 'video streaming service slice management' example.

When instantiating a slice, a CAS may indicate a start time from which the slice is requested to be operational. Additionally, the CAS may further indicate an end time after which the slice is not needed by the CAS anymore. This may be done by, for example, adding new parameters in the slice object returned by the CAS to the SREF, e.g. "start_time":

1554098400, and "end_time": 1554127200. In this example the times are expressed according to the Unix time (i.e. number of seconds that have elapsed since 00:00:00 Thursday, 1 Jan. 1970, Coordinated Universal Time, minus leap seconds). However, any other suitable type of time format may be used as well.

In another embodiment, the SREF may be configured to determine if any of the properties of the network slice that the CAS is using have changed. For example, the RAN bandwidth allocated to said network slice may have been reduced, e.g., to give room to a higher priority network slice (such as a network slice to be used for a public safety emergency). In this case, it may be desirable to have the SREF inform the CAS about it, so that the CAS can in turn manage its services accordingly. Accordingly, the CAS may indicate, when instantiating a slice, an endpoint where the SREF may send notifications to. In an alternative embodiment, when passing the slice object to the CAS, the SREF may also pass, as a separate object or as part of the slice object itself, an event list related to the particular slice object. The CAS may then subscribe to any of the events in the list by returning, next or as part of the slice object itself, a list of events it is interested into and the corresponding CAS endpoint that the SREF may use to send notifications to.

Data Processing Entities

Figure 9:
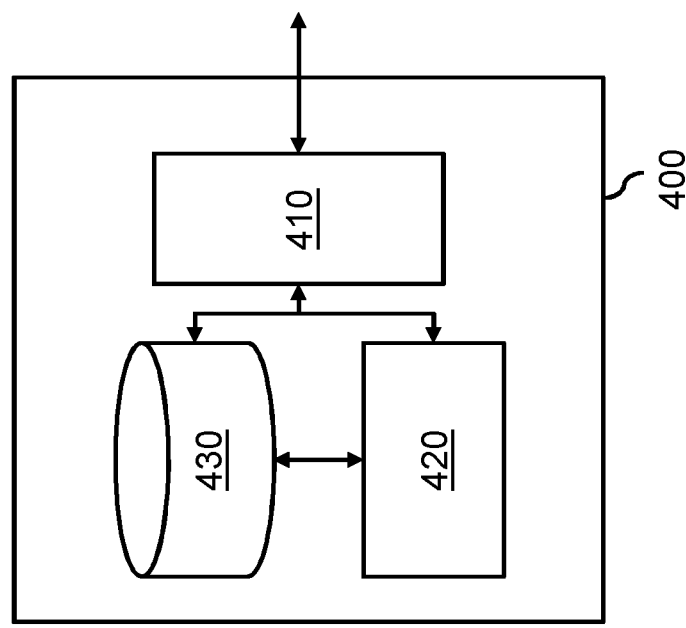
FIG. 9 shows a system which may represent a network node implementing the SREF and/or the content application server (CAS)

FIG. 9 shows a system 400 which may represent a network node implementing a) the SREF, b) a network function comprising the SREF, c) the CAS or d) the CAS comprising the SREF. The system 400 may comprise a network interface 410 for communicating with (other) network nodes in the network. The network interface 410 may take any suitable form, including but not limited to a wired network interface based on Ethernet or optical fiber or a wireless network interface. FIG. 9 further shows the system 400 comprising a storage 430, such as a hard disk, a solid-state drive, or an array thereof, which may be used by the system 400 for storing data.

The system 400 may further comprise a processor subsystem 420, which may also simply be referred to as a 'processor system', and which may be configured, e.g., by hardware design or software, to perform the operations described in this specification in as far as pertaining to the SREF and/or the CAS. For example, the processor 420 may be embodied by a single Central Processing Unit (CPU), but also by a combination or system of such CPUs and/or other types of processing units. In general, the system 400 may be embodied by a (single) device or apparatus, e.g., a network server. However, the system 400 may also be embodied by a distributed system of such devices or apparatuses, e.g., a distributed system of network servers.

In general, the SREF and/or the CAS may be implemented at least in part by a device or apparatus. The device or apparatus may comprise one or more (micro)processors which execute appropriate software. Software implementing the functionality of the function(s) may have been downloaded and/or stored in a corresponding memory or memories, e.g., in volatile memory such as RAM or in non-volatile memory such as Flash. Alternatively, the function(s) may be implemented in the device or apparatus in the form of programmable logic, e.g., as a Field-Programmable Gate Array (FPGA). In general, each function may be implemented as a circuit.

It is noted that any of the methods described in this specification, for example in any of the claims, may be implemented on a computer as a computer implemented method, as dedicated hardware, or as a combination of both.

Figure 10:
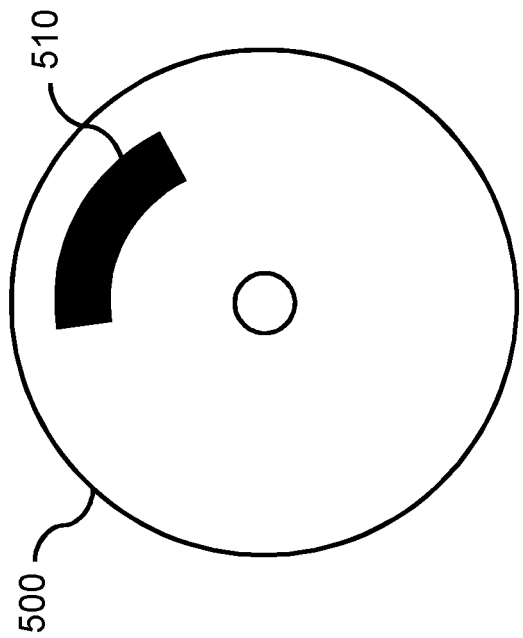
FIG. 10 shows a computer readable medium comprising data.

Instructions for the computer, e.g., executable code, may be stored on a computer readable medium 500 as for example shown in FIG. 10, e.g., in the form of a series 510 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 10 shows by way of example an optical storage device 500.

In an alternative embodiment of the computer readable medium 500 of FIG. 10, the computer readable medium 500 may comprise transitory or non-transitory data 510 representing a data structure of the slice object described in this specification.

Figure 11:
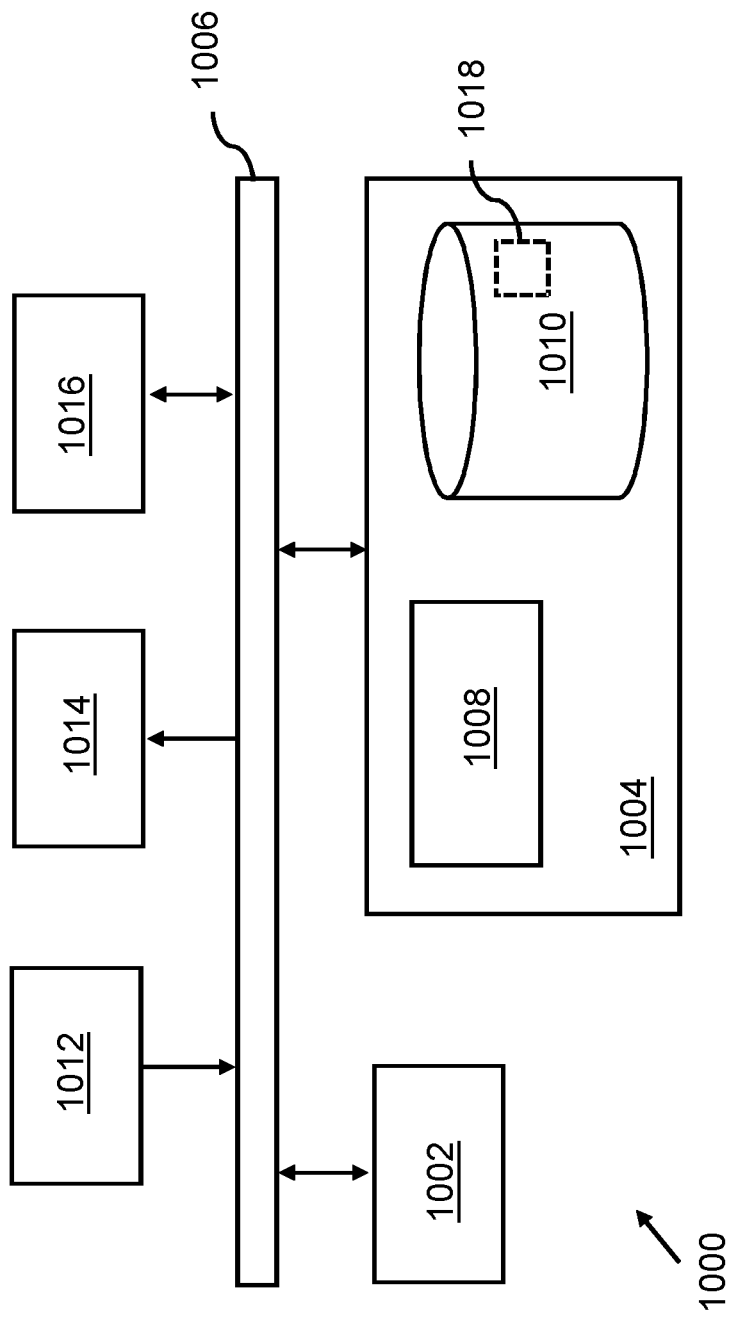
FIG. 11 shows an exemplary data processing system.

FIG. 11 is a block diagram illustrating an exemplary data processing system that may be used in the embodiments described in this specification. Such data processing systems include data processing entities described in this specification, including but not limited to data processing entities implementing functions such as but not limited to the SREF, the CAS, etc. The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 11, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may implement the SREF. In that case, application 1018 may represent an application that, when executed, configures data processing system 1000 to perform the functions described herein with reference to the SREF. In another aspect, data processing system 1000 may implement the CAS. In that case, application 1018 may represent an application that, when executed, configures data processing system 1000 to perform the functions described herein with reference to the CAS.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A network node or a distributed system of network nodes configured as a network function for a communication network, wherein the communication network is configured to enable instantiation of network slices which represent virtual networks, wherein the communication network comprises one or more slice management network functions for management of the network slices, wherein the network node or the distributed system comprises:
   a network interface configured to communicate with the communication network;
   a processor system for enabling a content application server (CAS), which is configured to provide an application service via a network slice to at least one user equipment (UE), to at least in part manage the network slice, wherein the processor system is configured to:
      generate an abstraction of properties of the network slice in the form of a data structure representing a slice object;
      expose the properties of the network slice to the content application server by providing access to the slice object;
   wherein the slice object comprises at least one modifiable object property representing one or more properties of the network slice which are modifiable by at least one slice management network function,
   wherein the processor system is further configured to:
      enable the content application server to modify the modifiable object property to obtain a modified object property; and
      based on the modified object property, send a request to the at least one slice management network function to request a corresponding modification of the one or more properties of the network slice.

2. The network node or the distributed system according to claim 1, wherein the processor system is configured to enable the content application server (CAS) to access the slice object and/or to modify the modifiable object property of the slice object via an application programming interface (API).

3. The network node or the distributed system according to claim 2, wherein the application programming interface (API) comprises a set of functions which include at least a function for modifying the modifiable object property, and wherein the processor system is configured to expose the set of functions of the application programming interface to the content application server (CAS).

4. The network node or the distributed system according to claim 3, wherein the set of functions further comprise at least one of:
   a function for requesting a network slice to be instantiated;
   a function for requesting a network slice to be removed.

5. The network node or the distributed system according to claim 1, wherein the communication network further comprises one or more traffic control network functions for controlling traffic in network slices, and wherein the slice object comprises at least one further modifiable object property which represents one or more properties of the network slice which are associated with traffic control by the one or more traffic control functions.

6. The network node or the distributed system according to claim 1, wherein the processor system is configured to determine an authorization level of the content application server (CAS), and depending on the authorization level of the content application server, configure at least one of:
   which object properties are included in the slice object;
   which object properties of the slice object are modifiable, and
   which property value of the modifiable object property is selectable, by the content application server.

7. The network node or the distributed system according to claim 1, wherein the processor system is configured to:
   determine if one or more properties of the network slice have changed;
   change the slice object in accordance with said change; and
   notify the content application server (CAS) that the slice object property has changed.

8. A communication network configured to enable instantiation of network slices which represent virtual networks, wherein the communication network comprises one or more slice management network functions for management of the network slices, wherein the communication network comprises the network node or distributed system according to claim 1.

9. A content application server (CAS) configured to provide an application service via a network slice of a communication network to at least one user equipment (UE), wherein the communication network is configured to enable instantiation of network slices which represent virtual networks, wherein the communication network comprises one or more slice management network functions for management of the network slices,
   wherein the content application server comprises:
      a network interface configured to communicate with the communication network;

a processor system configured to:
- authenticate to a network function (SREF) which is configured to enable the content application server to at least in part manage the network slice;
- access a slice object generated by the network function, wherein the slice object comprises at least one modifiable object property representing one or more properties of the network slice which are modifiable by at least one slice management network function; and
- manage the network slice by modifying the modifiable object property of the slice object to obtain a modified object property.

10. The content application server according to claim 9, wherein the processor system is configured to access the slice object and/or to modify the modifiable object property of the slice object via an application programming interface (API) provided by the network function.

11. A computer implemented method for use with a communication network which is configured to enable instantiation of network slices which represent virtual networks, wherein the communication network comprises one or more slice management network functions for management of the network slices, wherein the method comprises enabling a content application server (CAS), which is configured to provide an application service via a network slice to at least one user equipment (UE), to at least in part manage the network slice by:
- generating an abstraction of properties of the network slice in the form of a data structure representing a slice object;
- exposing the properties of the network slice to the content application server by providing access to the slice object;
- wherein the slice object comprises at least one modifiable object property representing one or more properties of the network slice which are modifiable by at least one slice management network function, wherein the method further comprises:
- enabling the content application server to modify the modifiable object property to obtain a modified object property; and
- based on the modified object property, sending a request to the at least one slice management network function to request a corresponding modification of the one or more properties of the network slice.

12. A computer implemented method for use with a content application server (CAS) configured to provide an application service via a network slice of a communication network to at least one user equipment (UE), wherein the network slice represents a virtual network, wherein the communication network is configured to enable instantiation of network slices, wherein the communication network comprises one or more slice management network functions for management of the network slices, wherein the method comprises:
- authenticating to a network function (SREF) which is configured to at least in part enable the content application server to manage the network slice;
- accessing a slice object generated by the network function, wherein the slice object comprises at least one modifiable object property representing one or more properties of the network slice which are modifiable by at least one slice management network function; and
- managing the network slice by modifying the modifiable object property of the slice object to obtain a modified object property.

13. A computer-readable medium comprising non-transitory data representing a computer program, the computer program comprising instructions for causing a processor system to perform the method according to claim 11.

* * * * *